(12) United States Patent
Ackermann

(10) Patent No.: US 8,076,438 B2
(45) Date of Patent: *Dec. 13, 2011

(54) METHOD FOR PRODUCING ORGANOPOLYSILOXANES

(75) Inventor: Hartmut Ackermann, Burghausen (DE)

(73) Assignee: Wacker Chemie AG, Munich (DE)

( * ) Notice: Subject to any disclaimer, the term of this patent is extended or adjusted under 35 U.S.C. 154(b) by 127 days.

This patent is subject to a terminal disclaimer.

(21) Appl. No.: 12/088,968

(22) PCT Filed: Sep. 8, 2006

(86) PCT No.: PCT/EP2006/066183

§ 371 (c)(1),
(2), (4) Date: Apr. 2, 2008

(87) PCT Pub. No.: WO2007/039402

PCT Pub. Date: Apr. 12, 2007

(65) Prior Publication Data

US 2008/0255334 A1   Oct. 16, 2008

(30) Foreign Application Priority Data

Oct. 4, 2005   (DE) .......................... 10 2005 047 395

(51) Int. Cl.
  *C08G 77/06*   (2006.01)
(52) U.S. Cl. ............................................ 528/12; 528/10
(58) Field of Classification Search .................... 528/29, 528/12, 20, 10; 526/62, 64–67, 71; 556/400, 556/450, 466
  See application file for complete search history.

(56) References Cited

U.S. PATENT DOCUMENTS

| 3,450,672 | A |   | 6/1969  | Merrill et al. |        |
|-----------|---|---|---------|----------------|--------|
| 3,541,126 | A | * | 11/1970 | Baronnier et al. | 556/446 |
| 3,763,212 | A |   | 10/1973 | McEntee et al. |        |
| 3,846,358 | A | * | 11/1974 | Roedel         | 524/773 |
| 3,978,025 | A | * | 8/1976  | Magne          | 528/32 |
| 4,239,877 | A | * | 12/1980 | Roedel         | 528/14 |
| 4,298,753 | A | * | 11/1981 | Schinabeck et al. | 556/415 |
| 4,609,752 | A |   | 9/1986  | Giesing et al. |        |
| 6,069,220 | A | * | 5/2000  | Hoffmann et al. | 528/12 |
| 6,143,912 | A | * | 11/2000 | Lindner et al. | 556/451 |
| 6,197,914 | B1 | * | 3/2001 | Kaeppler et al. | 528/32 |
| 6,767,982 | B2 | * | 7/2004 | Standke et al. | 528/20 |
| 7,339,069 | B2 | * | 3/2008 | Schattenmann et al. | 556/471 |
| 7,514,518 | B2 | * | 4/2009 | Schattenmann et al. | 528/20 |
| 2001/0041781 | A1 | * | 11/2001 | Reusmann     | 528/10 |
| 2002/0086907 | A1 |   | 7/2002 | Standke et al. |        |

FOREIGN PATENT DOCUMENTS

| DE | 854 708           | 11/1952  |
|----|-------------------|----------|
| DE | 1 668 172         | 5/1971   |
| DE | 23 03 155 C2      | 8/1973   |
| DE | 228 550 A1        | 10/1985  |
| EP | 1 205 505 A2      | 5/2002   |
| JP | 2002-193980 A     | 7/2002   |
| JP | 2004-083883 A     | 3/2004   |
| WO | WO2004003058 A2 * | 1/2004   |

OTHER PUBLICATIONS

English Language Translation of Table 1 of DD 228550.*

* cited by examiner

*Primary Examiner* — Margaret Moore

(74) *Attorney, Agent, or Firm* — Brooks Kushman P.C.

(57) ABSTRACT

Organopolysiloxanes are prepared in a multistage process by a first partial hydrolysis with from 0.002 to 0.6 mol water per hydrolyzable chlorine and alcohol at a water to alcohol ratio of 0.001 to 1.5, then further hydrolyzing with additional water, and then separating an aqueous alcoholic phase from an organopolysiloxane phase.

18 Claims, No Drawings

METHOD FOR PRODUCING ORGANOPOLYSILOXANES

CROSS-REFERENCE TO RELATED APPLICATION

This application is the U.S. national phase of PCT Appln. No. PCT/EP2006/066183 filed Sep. 8, 2006 which claims priority to German application DE 10 2005 047 395.4 filed Oct. 4, 2005.

BACKGROUND OF THE INVENTION

1. Field of the Invention

The invention relates to a multistage process for the preparation of organopolysiloxanes by hydrolysis and condensation of chlorosilanes.

2. Description of the Related Art

Processes for the preparation of organopolysiloxanes are already known. In this context, reference may be made, for example, to DE 16 68 172 A, in which a water-soluble inert solvent is used. Furthermore, DE 854 708 B describes a process for the preparation of siloxane resins, in which alkoxylation, hydrolysis and condensation are carried out in one step, the reactions taking place in an uncontrolled manner.

The present invention relates to a process for the preparation of organopolysiloxanes, in which in a first step, chlorosilanes are reacted with from 0.002 to 0.6 mol of water per mole of hydrolyzable chlorine and with from 0.3 to 1.6 mol of alcohol per mole of hydrolyzable chlorine, the molar ratio of water to alcohol being from 0.001 to 1.5, in a second step, the reaction mixture obtained in the first step is optionally mixed with a water-insoluble organic solvent having a density of less than 0.9 kg/l, and water is metered in in amounts of from 0.2 to 100 mol of water per mole of Si component, and in a third step, after the end of the reactions of the second step, the aqueous alcoholic phase is separated off.

DESCRIPTION OF THE EMBODIMENTS

In the context of the present invention, the term organopolysiloxanes is intended to include polymeric, oligomeric and dimeric siloxanes.

The chlorosilanes used in the first step of the process according to the invention are preferably those of the formula

$$R_aSiCl_{4-a} \quad (I)$$

in which R may be identical or different and is a monovalent, SiC-bonded, optionally substituted hydrocarbon radical and a is 0, 1, 2, or 3.

Examples of radicals R are alkyl radicals such as the methyl, ethyl, n-propyl, isopropyl, n-butyl, isobutyl, tert-butyl, n-pentyl, isopentyl, neopentyl or tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radical; cycloalkyl radicals such as cyclopentyl, cyclohexyl, cycloheptyl and methylcyclohexyl radicals; aryl radicals such as the phenyl and the naphthyl radicals; alkaryl radicals such as the o-, m-, and p-tolyl radicals, xylyl radicals and ethylphenyl radicals; and aralkyl radicals such as the benzyl radical and the α- and the β-phenylethyl radicals.

Examples of substituted radicals R are all radicals which are mentioned above for R, optionally substituted by mercapto groups, epoxy-functional groups, carboxyl groups, keto groups, enamine groups, amino groups, aminoethylamino groups, isocyanato groups, aryloxy groups, acryloyloxy groups, methacryloyloxy groups, hydroxyl groups and halogen groups.

Radical R preferably includes hydrocarbon radicals having 1 to 8 carbon atoms, most preferably the methyl radical.

Examples of silanes of the formula (I) are methyltrichlorosilane, dimethyldichlorosilane, trimethylchlorosilane, isooctyltrichlorosilane, phenyltrichlorosilane, diphenyldichlorosilane and methylphenyldichlorosilane.

The silanes used in the process according to the invention are preferably liquid at 20° C. under pressure from 900 to 1100 hPa.

Mixtures of silanes of the formula (I) with at least one trichlorosilane are preferably used.

In the context of the present invention hydrolyzable chlorine is to be understood as meaning that chlorine which is present in the form of SiCl groups.

In the first step of the process according to the invention, chlorosilanes are preferably reacted with from 0.0021 to 0.58 mol, more preferably from 0.0022 to 0.55 mol, of water per mole of hydrolyzable chlorine, and with from 0.35 to 1.5 mol, more preferably from 0.4 to 1.4 mol, of alcohol per mole of hydrolyzable chlorine. In the first step of the process according to the invention, the molar water-to-alcohol ratio used is preferably from 0.0015 to 1.45.

Examples of alcohols which can be used in the first step of the process according to the invention are all alcohols which are liquid at a temperature of 20° C. and a pressure of from 900 to 1100 hPa, such as methanol, ethanol, n-propanol, isopropanol butanol, pentanol, hexanol or heptanol, methanol, ethanol and butanol being preferred and ethanol being particularly preferred.

If desired, further substances can also be used in addition to chlorosilanes, water and alcohol in the first step of the process according to the invention. Examples of optionally used further substances are water-insoluble organic solvents, such as toluene, or alkoxysilanes, such as tetraethoxysilane.

The first step of the process according to the invention is preferably carried out at a temperature from 0 to 100° C., in particular from 20 to 70° C., and preferably at a pressure of from 900 to 2000 hPa, more preferably from 1000 to 1500 hPa.

In the first step of the process according to the invention, silane, water, alcohol and optionally further substances are mixed together in any desired manner and allowed to react, alkoxysilanes, alkoxychlorosilanes and their hydrolysates and condensates and, in gaseous form, hydrogen chloride, alkyl chloride and dialkyl ether forming. The hydrogen chloride gas obtained in the first step can be used directly in other processes, for example with methanol for the preparation of chloromethane, which in turn is used in the methylchlorosilane synthesis. Thus, the chlorine can be circulated without being released to the environment.

The first step may be carried out batchwise or continuously, the batchwise process preferably being carried out with stirring.

The first step of the process according to the invention is preferably carried out in a loop reactor, particularly preferably without introduction of mechanical energy, i.e. only with natural circulation.

In the reaction mixture obtained in the first step, the silicon component substantially comprises chloro-, hydroxy-, and alkoxy-functional silanes and siloxanes and optionally cyclosiloxanes. Furthermore, the reaction mixture contains water, alcohol, hydrogen chloride and small amounts of alkyl chloride, dialkyl ether and optionally further substances.

In the context of the present invention, data relating to the density are intended to be based on a temperature of 20° C. and ambient pressure, i.e. from 900 to 1100 hPa.

In the context of the present invention water-insoluble organic solvents are to be understood as meaning those solvents which have a solubility at 25° C. and ambient pressure, i.e. from 900 to 1100 hPa, of less than 1 g of solvent/100 g of water.

Examples of water-insoluble organic solvents optionally used in the process according to the invention are saturated hydrocarbons such as pentane, hexane, heptane or octane and branched isomers thereof and mixtures of the saturated hydrocarbons, unsaturated hydrocarbons such as hexene, heptene, octene and 1-decene, ketones such as acetone, methyl ethyl ketone and methyl isobutyl ketone, and aromatic hydrocarbons, such as benzene, toluene and xylenes, preferably toluene.

If water-insoluble organic solvent is used in the second step of the process according to the invention, the relevant amounts are preferably from 1 to 100 mol, particularly preferably from 2 to 90 mol, based in each case on one mole of silicon component. Water-insoluble organic solvent is preferably used in the second step.

If desired, further substances may also be used in the second step of the process according to the invention. Examples of optionally used further substances are chlorosilanes such as those of the formula (I), alkoxysilanes such as tetraethoxysilane, or alcohols such as ethanol. If further substances are used in the second stage, the relevant amounts are preferably from 0.01 to 40 parts by weight, based on 100 parts by weight of the silicon component used in the first step.

In the second step of the process according to the invention, the silicon component of the reaction mixture obtained in the first step and optionally used further silanes are hydrolyzed and condensed to the desired degree of polymerization by controlled addition of water.

In a preferred embodiment of the process according to the invention, the reaction mixture obtained in the first step is optionally mixed with toluene and optionally with other substances in the second step and water is metered in over a defined period, the mixing process being carried out by means of introduction of mechanical energy, for example, a stirrer.

In a particularly preferred embodiment of the process according to the invention, the second step is carried out in a batch reactor such as, for example, those having an internal volume of 12 m³, by conveying the reaction mixture obtained in the first step from the bottom of the reactor via a pump circulation line (for example at a circulation rate in the reactor of 80 m³/h) into the lower third of the reactor and metering water in the course of a period of preferably from 5 to 100 minutes into the pump circulation line, it being possible to effect stirring simultaneously.

In a further particularly preferred embodiment of the process according to the invention, the water used in the second stage is metered from above into the reactor, stirring being effected simultaneously.

The second step of the process according to the invention is preferably carried out at a temperature of from 0 to 100° C., in particular from 20 to 80° C., and preferably at a pressure of from 500 to 2000 hPa, more preferably from 600 to 1500 hPa.

The hydrolysis or condensation reaction taking place in the second step can be stopped by any desired method known to date, such as, for example, dilution with water or neutralization with base, for example, sodium hydroxide solution.

In the third step of the process according to the invention, the siloxane phase optionally containing solvent is separated from the aqueous alcoholic hydrogen chloride phase. This can be effected by methods known to the person skilled in the art, such as, for example, stirring the reaction mixture for 5 to 60 minutes until the phases have separated, discharging and working up the HCl, alcohol and water-containing phase, and pumping off and working up the siloxane-containing phase.

The siloxane phase thus obtained can then be worked up by any desired method known per se, such as, for example, neutralization, filtration or separation of all readily volatile constituents, preferably by distillation. The readily volatile constituents are preferably cyclic siloxanes and the water-insoluble organic solvents having a density of less than 0.9 kg/l. Furthermore, the concentration can be increased, for example, in the siloxane phase by removing the solvent, for example, by distillation in a thin-film evaporator, and organopolysiloxane solutions can thus be prepared or the solvent can be completely removed and solvent-free siloxanes thus obtained.

A multiplicity of organopolysiloxanes having defined properties can be reproducibly prepared by the process according to the invention, such as, for example, those which contain SiC-bonded radicals, hydroxyl radicals and/or alkoxy radicals. In particular, the process according to the invention is understandingly suitable for the preparation of organopolysiloxane resins.

The organopolysiloxanes prepared according to the invention may be solid or liquid at 20° C. and a pressure of from 900 to 1100 hPa and preferably have an average molecular weight, measured against a polystyrene standard, of from 162 to 100,000 g/mol, more preferably from 200 to 20,000 g/mol.

The organopolysiloxanes prepared according to the invention are at least partially, but preferably completely, soluble in alkoxy- and/or hydroxysilanes and condensates thereof. The organopolysiloxanes prepared according to the invention are preferably those of the formula

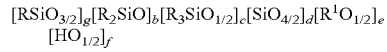

where R is a methyl, isooctyl or phenyl radical, $R^1$ is a methyl, ethyl or butyl radical, g=2-200, b=0-100, c=0-50, d=0-100, e=0-20 and f=0-10.

Examples of organopolysiloxanes prepared according to the invention are $[MeSiO_{3/2}]_{72}[Me_2SiO]_{24}[EtO_{1/2}]_{2.8}[HO_{1/2}]_{0.4}$, $[MeSiO_{3/2}]_{12.2}[Me_2SiO]_{3.3}[Me_3SiO_{1/2}]_{1.4}[EtO_{1/2}]_{0.6}[HO_{1/2}]_{0.18}$, $[MeSiO_{3/2}]_{15.3}[Me_2SiO]_{2.6}[Me_3SiO_{1/2}]_1[IoSiO_{3/2}]_{0.8}[MeO_{1/2}]_2[HO_{1/2}]_{0.3}$ and $[PhSiO_{3/2}]_{9.8}[Me_2SiO]_2[MeO_{1/2}]_{1.8}[BuO_{1/2}]_{0.04}[HO_{1/2}]_{0.18}$, Me being a methyl radical, Et being an ethyl radical, Io being an isooctyl radical, Ph being a phenyl radical and Bu being a butyl radical.

The organopolysiloxanes prepared according to the invention can be used for all purposes for which organopolysiloxanes are useful for example in building protection, in the coating sector, in cosmetic products and in the textile and paper sectors. They are particularly suitable for the preparation of emulsions and as binders for the preparation of paints and finishes.

The process according to the invention has the advantage that it is simple to carry out and organopolysiloxanes having a high yield can be prepared, and that the optionally used water-insoluble organic solvents, the hydrogen chloride and the alcohol can be recovered in a simple manner.

With the aid of the process according to the invention, organopolysiloxanes are obtained which have a high storage stability, a very low chloride content and a low VOC content and can be prepared very economically.

The process also has the advantage of being able to prepare organopolysiloxanes which are solid at ambient temperature and which have a glass transition temperature (Tg) of up to 50° C. (heating rate 6° C. per minute).

In the following examples, all data on parts and percentages are based on weight, unless stated otherwise. Unless stated otherwise, the following examples are carried out at ambient pressure, i.e. at about 1000 hPa, and at room temperature i.e. about 20° C. or a temperature which is established on combining the reactants at room temperature without additional heating or cooling. All viscosity data mentioned in the examples are intended to be based on a temperature of 25° C.

EXAMPLE 1

1000 kg/h of a chlorosilane mixture comprising 800 kg/h of methyltrichlorosilane and 200 kg/h of dimethyldichlorosilane and 700 kg/h of a mixture of 638 kg/h of ethanol and 62 kg/h of water are metered continuously into a continuously operated reaction loop having an internal volume of 1.35 $m^3$, of which 0.85 $m^3$ represents devolatilization volume, and a natural circulation. The reaction temperature is 30-35° C., the gauge pressure is 100 to 250 mbar and the average residence time is 20-24 minutes. During the reaction, 350-400 kg/h of hydrogen chloride are liberated, which hydrogen chloride is fed to the hydrogen chloride recovery plant. For the hydrolysis/condensation, 2500 kg of the HCl-concentrated partial alkoxylate thus obtained is initially introduced with 3000 kg of toluene in a batch reactor having an internal volume of 12 $m^3$ and 510 kg of water are metered in in the course of 75 minutes with thorough mixing (80 $m^3$/h). The reaction temperature is up to 70° C., the gauge pressure is from 60 to 250 mbar and the residence time is 75 minutes.

By adding 3050 kg of water, the acid concentration is reduced to an unreactive degree (HCl content in the acid phase, ethanol phase, water phase <14% by weight). After careful thorough mixing for from 5 to 15 minutes, the mixture is discharged into a 12 $m^3$ container and stirred for 60 minutes. Thereafter, the ethanol/hydrogen chloride/water-containing phase is separated from the siloxane-containing toluene phase. In further working-up steps, the resin-containing toluene phase is concentrated to a higher solids content in distillation column operated with random packings (bottom temperature 114° C., bottom gauge pressure 100 mbar, residence time 60 minutes), neutralized with sodium bicarbonate, freed from catalytically active metal traces with active carbon and then filtered over a filter aid and freed from volatile constituents in a thin-film evaporator (120-200° C.) and with a vacuum of from 50 to 100 mbar. The toluene obtained in the reaction step comprising concentration and thin-film evaporation is used again in the second reaction step. The acidic ethanolic/aqueous phase from the third step (phase separation) is redistilled after being rendered alkaline and is used again in the first reaction step.

An organopolysiloxane having an average empirical formula $[MeSiO_{3/2}]_{72}[Me_2SiO_{2/2}]_{23.9}[EtO_{1/2}]_{2.8}[HO_{1/2}]_{0.4}$ according to $^1$H-NMR, $^{29}$Si-NMR and GPC spectroscopy (measured against polystyrene standard, taking into account the weight average Mw) is obtained.

EXAMPLE 2

500 kg/h of a chlorosilane mixture comprising 100 kg/h of methyltrichlorosilane and 400 kg/h of dimethyldichlorosilane and 475 kg/h of a mixture of 433 kg/h of ethanol and 42 kg/h of water are metered continuously into the reaction loop described in Example 1 (reaction temperature: 60° C.; gauge pressure 100 to 250 mbar, residence time: 18 minutes).

For the hydrolysis/condensation, 2000 kg of the reaction mixture thus obtained and concentrated in hydrogen chloride gas are initially introduced with 120 kg of trimethylchlorosilane into a batch reactor and 120 kg of water are metered in in the course of 85 minutes with thorough mixing (reaction temperature: up to 70° C., gauge pressure from 10 to 200 mbar, residence time: 85 minutes).

The further working-up is effected as described in Example 1.

An organopolysiloxane having an average formula $[MeSiO_{3/2}]_5[Me_2SiO_{3/2}]_{22.9}[Me_3SiO_{1/2}]_{3.9}[EtO_{1/2}]_{0.3}[HO_{1/2}]_{0.04}$ according to 1H-NMR, 29Si-NMR and GPC spectroscopy (measured against polystyrene standard, taking into account the weight average Mw) is obtained.

The invention claimed is:

1. A process for the preparation of organopolysiloxanes, comprising partially hydrolyzing and then further hydrolyzing chlorosilanes by sequential first and second steps consisting of:
   in a first continuous step, partially hydrolyzing chlorosilanes by reacting chlorosilanes and optionally an alkoxysilane in a loop reactor with natural circulation with a liquid component consisting essentially of water and alcohol, containing from 0.002 to 0.6 mol of water per mole of hydrolyzable chlorine and from 0.3 to 1.6 mol of alcohol per mol of hydrolyzable chlorine to form an Si component which is a partial hydrolysate, the molar ratio of water to alcohol being from 0.001 to 1.5, wherein gaseous HCl is generated and withdrawn as a gas from the loop reactor during the first step,
   in the second step, further hydrolyzing the partial hydrolysate of the first step by introducing the partial hydrolysate of the first step from the loop reactor into a batch reactor and metering into the batch reactor a chlorosilane hydrolysis component consisting essentially of water and optionally alcohol, in an amount of from 0.2 to 100 mol of water per mol of Si component wherein the reaction mixture obtained in the first step is optionally mixed with a water-insoluble organic solvent having a density of less than 0.9 kg/l, wherein one or more chlorosilanes and/or one or more alkoxysilanes are optionally added in the second step, wherein in the second step, the water of the chlorosilane hydrolysis component hydrolyzes and condenses the Si component to an organopolysiloxane product, and
   in a third step, forming a two phase mixture comprising an aqueous alcoholic liquid phase and an organopolysiloxane phase containing the organopolysiloxane product, and separating the aqueous alcoholic liquid phase from the organopolysiloxane phase containing the organopolysiloxane product in a liquid/liquid separation.

2. The process of claim 1, wherein in the first step, chlorosilanes are reacted with from 0.0021 to 0.58 mol of water per mol of hydrolyzable chlorine.

3. The process of claim 1, wherein in the first step, chlorosilanes are reacted with from 0.35 to 1.5 mol of alcohol per mol of hydrolyzable chlorine.

4. The process of claim 2, wherein in the first step, chlorosilanes are reacted with from 0.35 to 1.5 mol of alcohol per mol of hydrolyzable chlorine.

5. The process of claim 1, wherein in the first step, the molar water-to-alcohol ratio is from 0.0015 to 1.45.

6. The process of claim 2, wherein in the first step, the molar water-to-alcohol ratio is from 0.0015 to 1.45.

7. The process of claim 3, wherein in the first step, the molar water-to-alcohol ratio is from 0.0015 to 1.45.

8. The process of claim 4, wherein in the first step, the molar water-to-alcohol ratio is from 0.0015 to 1.45.

9. The process of claim 1, wherein in the second step, at least one water-insoluble solvent having a density of less than 0.9 Kg/l is present.

10. The process of claim 1, wherein said organopolysiloxane is an organopolysiloxane resin.

11. The process of claim 1, wherein the organopolysiloxane product contains silicon-bonded hydroxyl radicals, silicon bonded alkoxy radicals, or both silicon bonded hydroxyl and alkoxy radicals.

12. A process for the preparation of organopolysiloxanes, comprising partially hydrolyzing and then further hydrolyzing chlorosilanes by sequential first and second steps consisting of:
  in a first step, partially hydrolyzing chlorosilanes by reacting chlorosilanes and optionally an alkoxysilane in a loop reactor with a liquid component consisting essentially of water and alcohol, containing from 0.002 to 0.6 mol of water per mole of hydrolyzable chlorine and from 0.3 to 1.6 mol of alcohol per mol of hydrolyzable chlorine to form an Si component which is a partial hydrolysate, the molar ratio of water to alcohol being from 0.001 to 1.5, wherein gaseous HCl is generated and withdrawn as a gas from the loop reactor during the first step,
  in the second step, further hydrolyzing the partial hydrolysate of the first step by metering in a chlorosilane hydrolysis component consisting essentially of water and optionally alcohol, in an amount of from 0.2 to 100 mol of water per mol of Si component wherein the reaction mixture obtained in the first step is optionally mixed with a water-insoluble organic solvent having a density of less than 0.9 kg/l, wherein one or more chlorosilanes and/or one or more alkoxysilanes are optionally added in the second step, wherein in the second step, the water of the second hydrolysis component hydrolyzes and condenses the Si component to an organopolysiloxane product, and
  in a third step, forming a two phase mixture comprising an aqueous alcoholic liquid phase and an organopolysiloxane phase containing the organopolysiloxane product, and separating the aqueous alcoholic liquid phase from the organopolysiloxane phase containing the organopolysiloxane product in a liquid/liquid separation, wherein in the second step, at least one of chlorosilane(s), alcohol(s), or alkoxysilane(s) are added.

13. The process of claim 1, wherein in addition to the chlorosilanes present, at least one alkoxysilane is present during said reacting in the first step.

14. A process for the preparation of organopolysiloxanes, comprising partially hydrolyzing and then further hydrolyzing chlorosilanes by sequential first and second steps consisting of:
  in a first step, partially hydrolyzing chlorosilanes by reacting chlorosilanes and optionally an alkoxysilane in a reactor with a liquid component consisting essentially of water and alcohol, containing from 0.002 to 0.6 mol of water per mole of hydrolyzable chlorine and from 0.3 to 1.6 mol of alcohol per mol of hydrolyzable chlorine to form an Si component which is a partial hydrolysate, the molar ratio of water to alcohol being from 0.001 to 1.5, wherein gaseous HCl is generated and withdrawn as a gas from the loop reactor during the first step,
  in a second step, further hydrolyzing the partial hydrolysate of the first step by metering in a chlorosilane hydrolysis component consisting essentially of water and optionally alcohol, in an amount of from 0.2 to 100 mol of water per mol of Si component wherein the reaction mixture obtained in the first step is optionally mixed with a water-insoluble organic solvent having a density of less than 0.9 kg/l, wherein one or more chlorosilanes and/or one or more alkoxysilanes are optionally added in the second step, wherein in the second step, the water of the chlorosilane hydrolysis component hydrolyzes and condenses the Si component to an organopolysiloxane product, and
  in a third step, forming a two phase mixture comprising an aqueous alcoholic liquid phase and an organopolysiloxane phase containing the organopolysiloxane product, and separating the aqueous alcoholic liquid phase from the organopolysiloxane phase containing the organopolysiloxane product in a liquid/liquid separation, wherein the aqueous alcoholic liquid phase in the third step is an acidic aqueous alcoholic liquid phase containing dissolved HCl, the acidic aqueous alcoholic phase alkaline to form an alkaline aqueous alcoholic phase, and recovering alcohol from the alkaline aqueous alcoholic phase by distillation, and introducing the alcohol thus recovered into the first step as a source of alcohol in the first step.

15. The process of claim 1, wherein the first chlorosilane hydrolysis component consists of water and alcohol.

16. The process of claim 1, wherein the second chlorosilane hydrolysis component consists of water.

17. The process of claim 1, wherein the first chlorosilane hydrolysis component consists of water and alcohol and the second chlorosilane hydrolysis component consists of water.

18. The process of claim 1, wherein the organopolysiloxane product is a solid organopolysiloxane resin.

* * * * *